United States Patent [19]

Shirakoshi et al.

[11] Patent Number: 5,072,307
[45] Date of Patent: Dec. 10, 1991

[54] FACSIMILE DEVICE

[75] Inventors: Hiroshi Shirakoshi, Nari; Hironori Tanaka, Yamatokoriyama, both of Japan

[73] Assignee: Sharp Kabushiki Kaisha, Osaka, Japan

[21] Appl. No.: 412,493

[22] Filed: Sep. 26, 1989

[30] Foreign Application Priority Data

Sep. 30, 1988 [JP] Japan ................. 63-247640

[51] Int. Cl.$^5$ ............................................. H04N 1/00
[52] U.S. Cl. ................................. 358/400; 358/476; 358/496
[58] Field of Search ............... 358/400, 476, 498, 496; 379/100

[56] References Cited

U.S. PATENT DOCUMENTS

| 4,438,459 | 3/1984 | Levine | 358/408 |
| 4,496,988 | 1/1985 | Moriguchi et al. | 358/296 |
| 4,962,430 | 10/1990 | Hiroki et al. | 358/401 |

FOREIGN PATENT DOCUMENTS

| 263319 | 4/1988 | European Pat. Off. |
| 58-166338 | 10/1983 | Japan |
| 59-125161 | 7/1984 | Japan |
| 61-225966 | 10/1986 | Japan |

OTHER PUBLICATIONS

English Language abstract of Japanese publication no. 59-125161.
European Search Report and Annex.
English language abstract of JP 58-166,338.
English language abstract JP 61-225,966.

Primary Examiner—Edward L. Coles, Sr.
Attorney, Agent, or Firm—Sandler, Greenblum & Bernstein

[57] ABSTRACT

A facsimile device has optical reader unit, an original transport unit, a printing unit, and a base unit. The optical reader unit comprises a light source for illuminating an original document, and an image reading element for receiving and reading the light reflected from the original document. The original transport unit comprises a feed roller and original guides for transporting the original document to an original reading position of the optical reader unit. The printing unit comprises a printer head and a flexible member which presses the printer head on a recording paper to be copied. The base unit comprises a recording paper holder and a platen. The base unit is provided for supporting each of the optical reader unit, the original transport unit and the printing unit.

8 Claims, 5 Drawing Sheets

FACSIMILE DEVICE

BACKGROUND OF THE INVENTION

1. Field of the Invention

The present invention relates to a facsimile device having an image reading mechanism and a printing mechanism.

2. Description of the Prior Art

As shown in FIG. 5, a prior art facsimile device has the multiple components, such as the original document reading mechanism for reading the image of the original document and the printing mechanism, are each independently mounted to the cabinet of the facsimile, and the original document reading assembly is located in a position above that of the printing assembly.

In the prior art facsimile device as thus described, because the various components are mounted directly to the main cabinet, mounting and adjusting the various components on the cabinet must be carried out on the assembly line, inviting increase of the manufacturing cost due to long assembly line with long time consuming word. Furthermore, it took long time for the service engineer to repair the facsimile device because the parts to be replaced must be disconnected from the cabinet.

Moreover, because the original document reading assembly is positioned to the top with the printing assembly to the bottom, the size, particularly the height, of the facsimile becomes bulky. Besides that, it took time for the user to replace the paper because the reading assembly must be lifted up in order to have an access to the paper installing area.

SUMMARY OF THE INVENTION

The present invention has been developed with a view to substantially solving the above-described problem and has for its essential object to provide an improved facsimile device which can be readily assembled and is compact in size.

It is also an important object of the present invention to provide the above described type of facsimile device which improves productivity in the assembly process and improves the serviceability of the product.

It is a further object of the present invention to provide a facsimile device which is thin and has a low profile.

In accomplishing these and other objects, a facsimile device according to the present invention comprises: an optical reader unit comprising a light source for illuminating an original document, and an image reading element for receiving and reading the light reflected from said original document; an original transport unit comprising a feed roller and original guides for transporting said original document to an original reading position of said optical reader unit; a printing unit comprising a printer head and a flexible member which presses said printer head on a recording paper to be copied; and a base unit comprising a recording paper holder and a platen, said base unit provided for supporting each of said optical reader unit, said original transport unit and said printing unit.

Also, according to the present invention, facsimile device comprises:

a printing assembly comprising a printing unit comprising a printer head and a flexible member which presses said printer head on a recording paper to be copied; a recording paper holder; and a platen; and a reader assembly comprising: an optical reader unit comprising a light source for illuminating an original document, and an image reading element for receiving and reading the light reflected from said original document; and an original transport unit comprising a feed roller for transporting the original document to a predetermined original reading position of said optical reader unit;

and is characterized in that the printing assembly and said reader assembly being positioned side by side.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which.

DETAILED DESCRIPTION OF THE INVENTION

Figure 1:
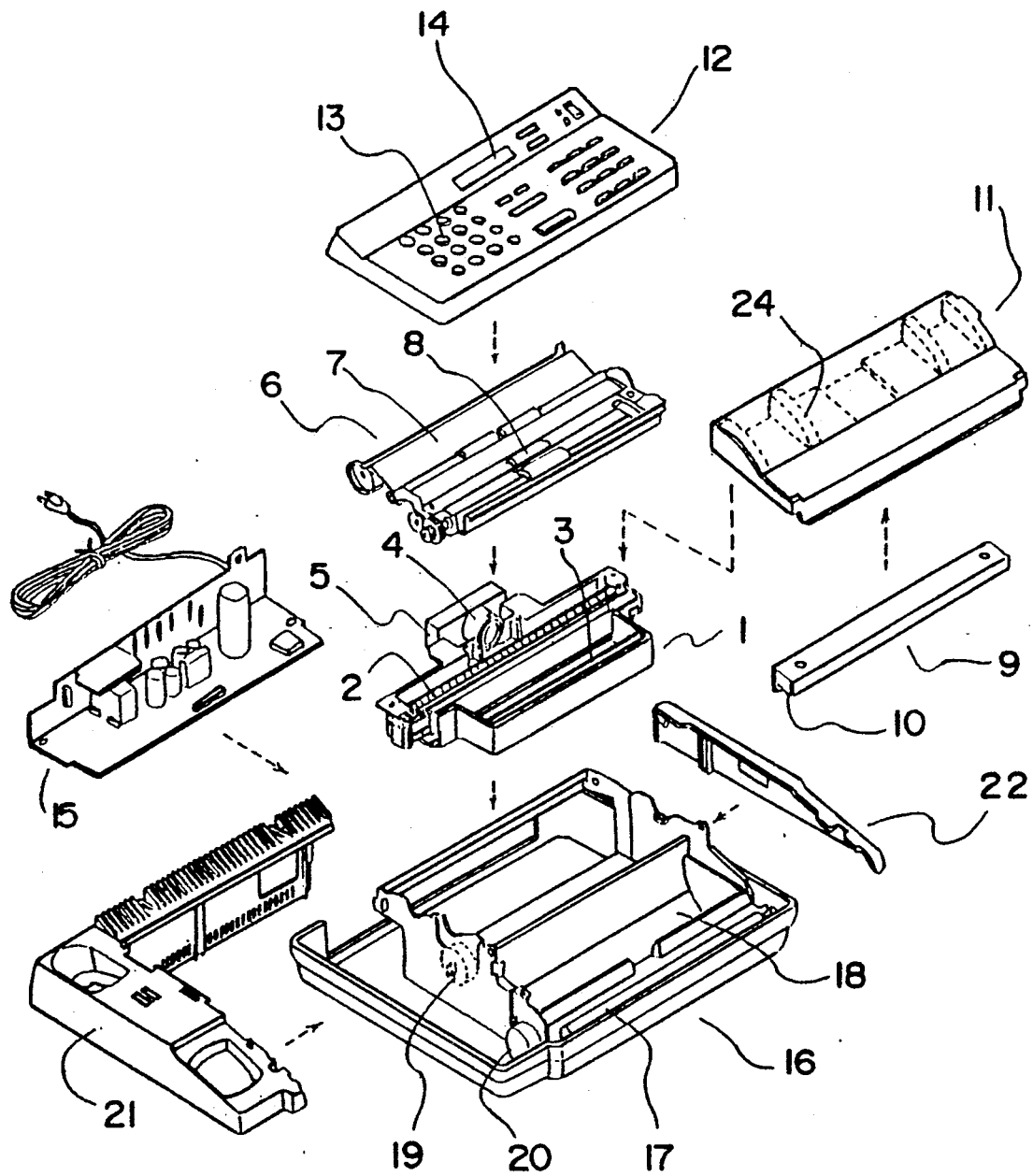
FIG. 1 is an exploded perspective view of a facsimile device according to a preferred embodiment of the present invention.

Referring to FIG. 1, an exploded view of the assembly of a facsimile device according to a preferred embodiment of the present invention is shown. In FIG. 1, reference number 1 is the optical reading unit used for reading the original document (not shown) and includes an LED lamp 2, mirror 3, lens 4, and CCD circuit board 5; 6 is the original transport unit used for transporting the original document and includes original guide member 7 and original transport rollers 8; and 9 is a printing unit including a printing head 10 and a flexible member 10a which presses said printer head 10 on a recording paper to be copied. Printer unit 9 is mounted below printer paper cover 11. An original width adjustment guide 24 is provided on top of printer paper cover 11.

Reference number 12 is a keyboard unit used for operating the facsimile and including keypad 13 and display panel 14; 15 is an electrical circuit board; 16 is the base unit to which are mounted units 1, 6, 9, 11, 12, and 15. The base unit 16 includes a platen roller 17, oppositely located printing unit 9, and paper install chamber 18. Furthermore, drive motor 19 for driving original transport rollers 8 mounted in original transport unit 6, and drive motor 20 for driving platen roller 17 are provided in base unit 16. Reference numbers 21 and 22 are the side cabinets.

Figure 2:
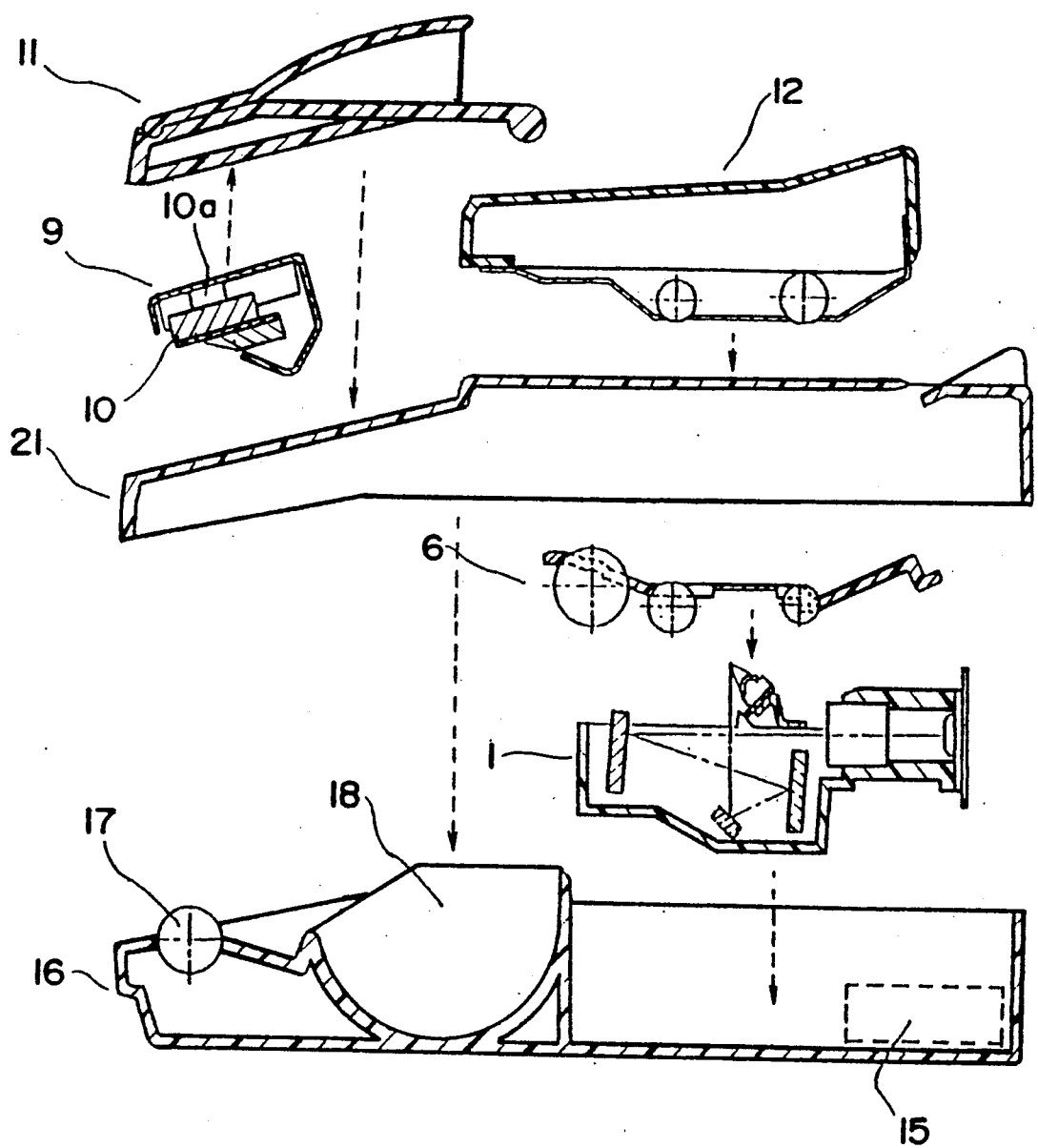
FIG. 2 is a cross-sectional view of each unit.

Referring to FIG. 2, a cross section of the assembled facsimile device of FIG. 1 is shown. Base unit 16 is constructed so that paper holder 18 and platen roller 17 are positioned at the front of base unit 16 (in the left of FIG. 2), and optical reading unit 1 and electrical circuit board 15 are positioned at the back of base unit 16 (in the right of FIG. 2). The original transport unit 6 is positioned above optical reading unit 1 at such a position that the original document can be transported to a predetermined reading position at optical reading unit 1. The keyboard unit 12, the bottom of which forms the original guide surface, is positioned above original transport unit 6.

The printing unit 9, installed below printer paper cover 11, is located above and in contact with platen roller 17 of base unit 16.

Figure 3:
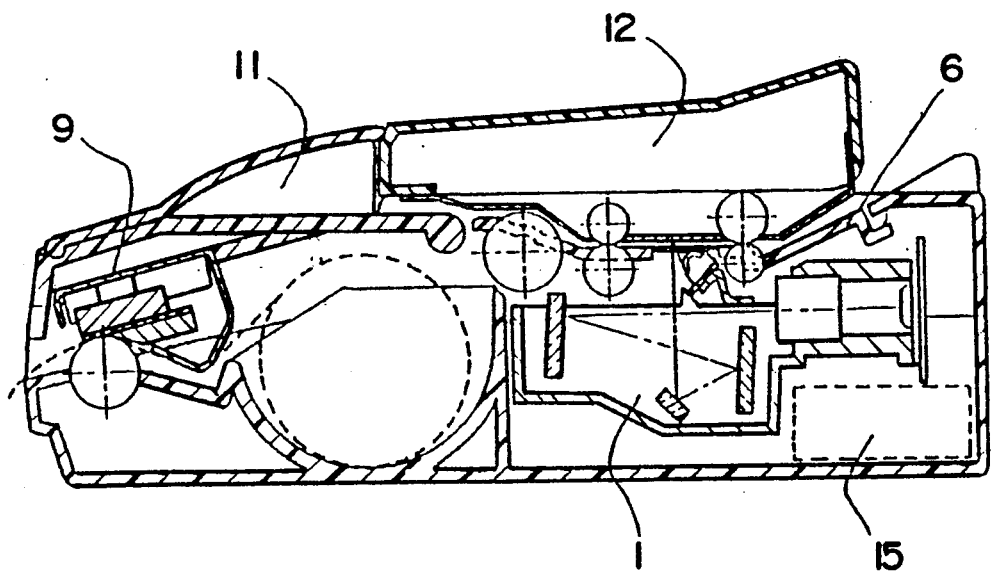
FIG. 3 is a cross-sectional view of the assembled facsimile device.

Referring to FIG. 3, a cross section of the assembled facsimile device is shown. As can be understood from this figure, by assembling the facsimile device from functionally discrete units, the assembly process is simplified and the height of the assembled product is lower because the printing unit is located to the front and the original reading unit is located to the back of the device.

Figure 4A:
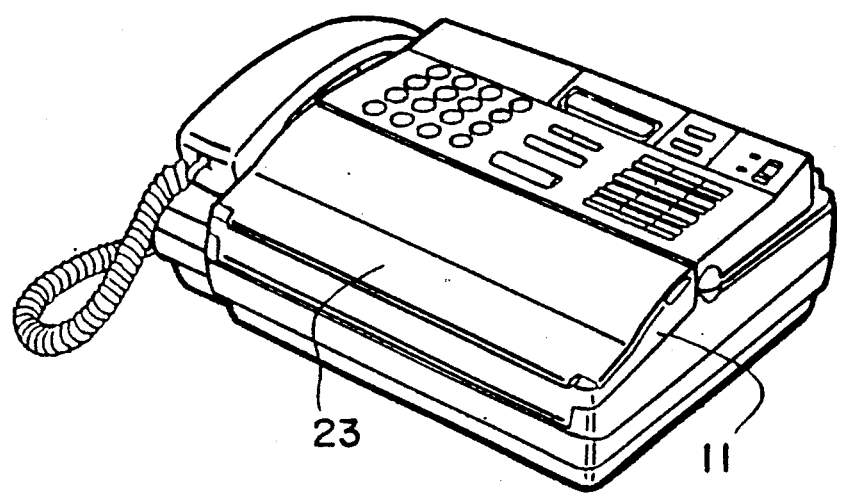
FIGS. 4a and 4b are perspective views of the facsimile device.
Figure 4B:
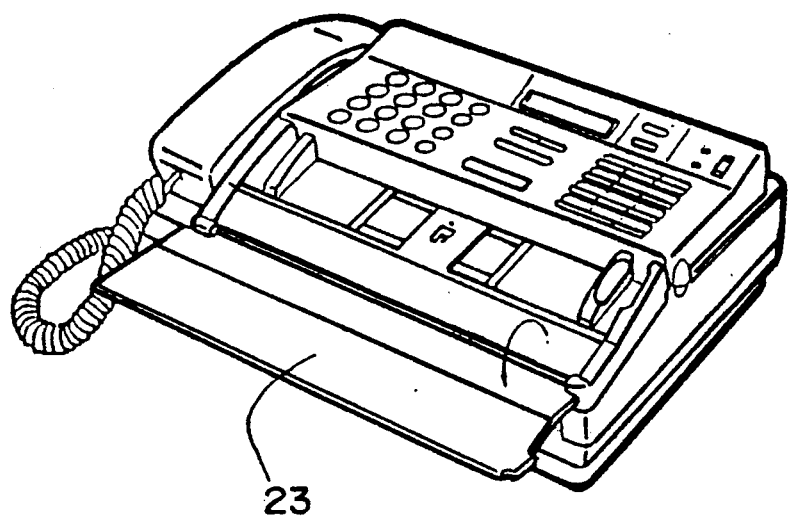
Figure 5:
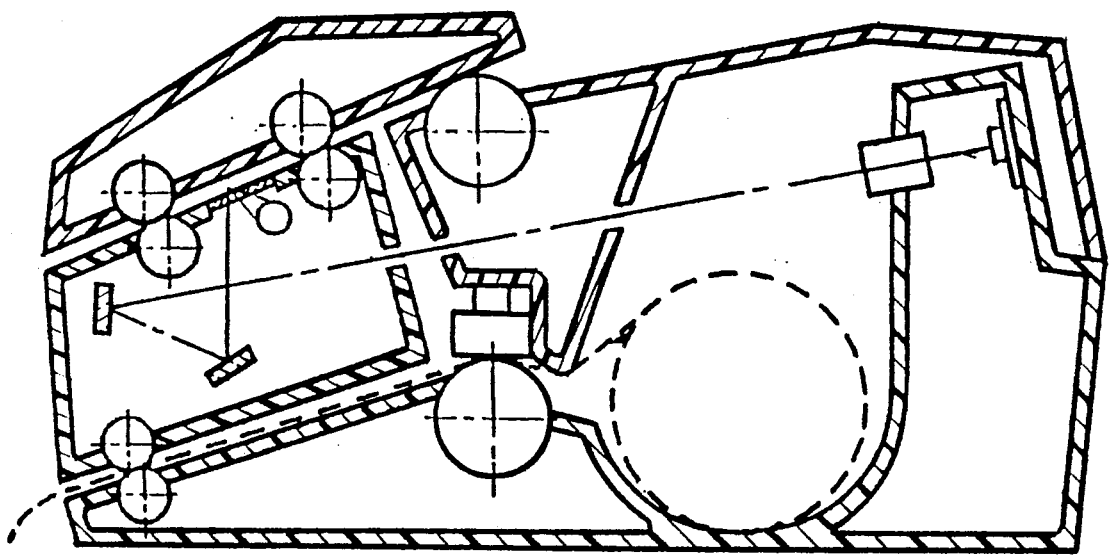
FIG. 5 is a cross-sectional view of the prior art facsimile device.

Referring to FIGS. 4a and 4b, the perspective views of the assembled facsimile device are shown, particularly, FIG. 4(a) shows the device when the printer paper cover 11 on hopper 23 is closed, and FIG. 4(b) shows the device when hopper 23 is opened in the direction of the arrow. When hopper 23 is positioned as shown in FIG. 4(b), hopper 23 serves as the original feed table.

By constructing a facsimile device from discrete functional units as described above, the assembly process is simplified. Thus, serviceability is improved by simplifying parts replacement, and it is easier to develop new models of the device.

In addition, by positioning the reading assembly and the printing assembly side by side, the finished product has a lower profile and it is easier to replace the printer paper.

Although the present invention has been fully described in connection with the preferred embodiment thereof with reference to the accompanying drawings, it is to be noted that various changes and modifications are apparent to those skilled in the art. Such changes and modifications are to be understood as defined by the appended claims unless they depart therefrom.

What is claimed is:

1. A facsimile device comprising:
    a modular optical reader unit comprising a light source for illuminating an original document, and an image reading element for receiving and reading light reflected from said original document;
    a modular original transport unit comprising a feed roller and original guides for transporting said original document to an original reading position of said optical reader unit;
    a modular printing unit comprising a printer head and a flexible member which presses said printer head on a recording paper to be copied; and
    a modular base unit comprising a recording paper holder and a platen, wherein said modular optical reader unit, said modular original transport unit, and said modular printing unit are removably supported on said base unit, whereby each of said modular units comprises a discrete assembly mounted on said base unit.

2. A facsimile device as defined in claim 1, wherein said base unit further comprises a first drive motor for driving said feed roller and a second drive motor for driving said platen roller.

3. A facsimile device comprising:
    a printing assembly comprising a modular printing unit having a printer head and a flexible member which presses said printer head on a recording paper to be copied, a recording paper holder, and a platen; and
    a reader assembly comprising a modular optical reader unit comprising a light source for illuminating an original document and an image reading element for receiving and reading light reflected from said original document, and a modular original transport unit comprising a feed roller for transporting the original document to a predetermined original reading position of said optical reader, wherein said printing assembly and said reader assembly are positioned in side by side fashion on a base unit which is adapted to support said modular printing unit, said modular optical reader unit, and said modular original transport unit.

4. A facsimile device comprising a modular optical reader unit including means for illuminating an original document and for receiving and reading light reflected from said original document, a modular original transport unit including means for transporting an original document to an original reading position within said optical reader unit, a modular printing unit including means for printing on a recording paper to be copied, and an electrical circuit board, wherein said modular optical reader unit, said modular unit, said modular printing unit, and said electrical circuit board are each supported as discrete units on a base member.

5. A facsimile device in accordance with claim 4, wherein at least a first portion of said optical reading unit and said electrical circuit board are positioned adjacent to each other at one end of a bottom surface of said support member.

6. A facsimile device in accordance with claim 5, wherein a second portion of said optical reading unit is positioned above, and supported by, said circuit board.

7. A facsimile device in accordance with claim 5, wherein said printing unit is supported by said support member at a second of said support member.

8. A facsimile device in accordance with claim 5, wherein said transport unit is positioned above said optical reading unit.

* * * * *

UNITED STATES PATENT AND TRADEMARK OFFICE
CERTIFICATE OF CORRECTION

PATENT NO. : 5,072,307

DATED : December 10, 1991

INVENTOR(S) : H. SHIRAKOSHI et al.

It is certified that error appears in the above-identified patent and that said Letters Patent is hereby corrected as shown below:

On the title page at [75], change "Nari" to ---Nara---.
On the title page, Item [57] line a after "has" insert --an--.

At column 1, line 13, of the printed patent, delete ---are---.
At column 1, line 63, of the printed patent, after "invention," insert ---the---.
At column 2, line 10, of the printed patent, change "being" to ---are---.

Signed and Sealed this

Tenth Day of August, 1993

Attest:

MICHAEL K. KIRK

Attesting Officer  Acting Commissioner of Patents and Trademarks